(12) United States Patent
Winslow et al.

(10) Patent No.: US 9,515,823 B2
(45) Date of Patent: Dec. 6, 2016

(54) CRYPTOGRAPHIC DEVICE WITH DETACHABLE DATA PLANES

(71) Applicant: L-3 Communications Corporation, New York, NY (US)

(72) Inventors: Richard Norman Winslow, Wilmington, DE (US); Frank A. Costantini, Woolwich Township, NJ (US)

(73) Assignee: L-3 COMMUNICATIONS CORPORATION, New York, NY (US)

(*) Notice: Subject to any disclaimer, the term of this patent is extended or adjusted under 35 U.S.C. 154(b) by 678 days.

(21) Appl. No.: 14/015,443

(22) Filed: Aug. 30, 2013

(65) Prior Publication Data
US 2016/0156462 A1  Jun. 2, 2016

(51) Int. Cl.
*H04L 29/06* (2006.01)
*H04L 9/08* (2006.01)
*H04W 12/04* (2009.01)

(52) U.S. Cl.
CPC ............ *H04L 9/083* (2013.01); *H04L 9/0869* (2013.01); *H04L 9/0891* (2013.01);
(Continued)

(58) Field of Classification Search
CPC ..................................................... H04L 9/083
See application file for complete search history.

(56) References Cited

U.S. PATENT DOCUMENTS 6,003,135 A   12/1999  Bialick et al.
6,215,609 B1   4/2001  Yamashita et al.
(Continued)

FOREIGN PATENT DOCUMENTS

WO    WO 2011144506 A1    11/2011

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; pp. 309-329; ACM Digital Library.*

(Continued)

*Primary Examiner* — Bradley Holder
(74) *Attorney, Agent, or Firm* — Condo Roccia Koptiw LLP

(57) ABSTRACT

A system for performing encryption and/or decryption may include a parent cryptographic device. The parent cryptographic device may be configured to receive a first cryptographic key. The parent cryptographic device may be configured to determine one or more session keys based on the first cryptographic key and/or internally generated random data bits. The parent cryptographic device may be configured to insert the one or more session keys onto one or more child cryptographic devices that are operably connected to the parent cryptographic device. The one or more child cryptographic devices may be configured to receive the one or more session keys from the parent cryptographic device, and perform one or more of encryption or decryption of communications exchanged with another child cryptographic device of the one or more child cryptographic devices. The one or more child cryptographic devices may perform encryption/decryption after separation from the parent cryptographic device.

20 Claims, 5 Drawing Sheets

(52) U.S. Cl.
CPC .......... *H04L 9/0897* (2013.01); *H04L 63/062* (2013.01); *H04W 12/04* (2013.01)

(56) References Cited

U.S. PATENT DOCUMENTS

| | | | |
|---|---|---|---|
| 6,904,110 B2* | 6/2005 | Trans | H04B 1/00 375/229 |
| 6,971,021 B1 | 11/2005 | Daspit et al. | |
| 7,170,997 B2 | 1/2007 | Petersen et al. | |
| 7,644,289 B2 | 1/2010 | Yancy et al. | |
| 8,306,228 B2* | 11/2012 | Le Saint | H04L 63/0421 380/259 |
| 8,321,687 B2 | 11/2012 | Lequere | |
| 8,370,643 B2 | 2/2013 | Miyazaki et al. | |
| 8,615,218 B2* | 12/2013 | Cho | H04L 63/062 455/404.2 |
| 8,774,411 B2* | 7/2014 | Cakulev | H04L 63/0428 380/255 |
| 2003/0016770 A1* | 1/2003 | Trans | H04B 1/00 375/346 |
| 2003/0086515 A1* | 5/2003 | Trans | H04B 1/00 375/346 |
| 2005/0036623 A1* | 2/2005 | Sheu | H04L 9/083 380/270 |
| 2005/0050004 A1* | 3/2005 | Sheu | H04L 9/083 |
| 2005/0186933 A1* | 8/2005 | Trans | H04B 1/00 455/296 |
| 2007/0042796 A1 | 2/2007 | Wenzel et al. | |
| 2007/0281665 A1* | 12/2007 | Cho | H04L 63/062 455/411 |
| 2010/0303238 A1* | 12/2010 | Cakulev | H04L 63/0428 380/272 |
| 2012/0075006 A1 | 3/2012 | Vu et al. | |
| 2012/0117378 A1 | 5/2012 | Modica et al. | |
| 2012/0127672 A1 | 5/2012 | Osen et al. | |
| 2012/0151004 A1 | 6/2012 | Pope | |
| 2012/0163587 A1 | 6/2012 | Chang et al. | |
| 2013/0062420 A1 | 3/2013 | Hamman et al. | |
| 2013/0212714 A1 | 8/2013 | Goh et al. | |

OTHER PUBLICATIONS

Penrig et al.; ELK, a new protocol for efficient large-group key distribution; Published in: Security and Privacy, 2001. S&P. 2001. Proceedings. 2001 IEEE Symposium on; Date of Conference: May 14-16, 2000; IEEE Xplore.*

* cited by examiner

CRYPTOGRAPHIC DEVICE WITH DETACHABLE DATA PLANES

CROSS-REFERENCE TO RELATED APPLICATIONS

This application may include subject matter that is related to subject matter included in U.S. patent application Ser. No. 14/015,424, entitled "RECEPTACLE-CONFIGURED CRYPTOGRAPHIC DEVICE," filed Aug. 30, 2013, the contents of which are hereby incorporated by reference in its entirety.

BACKGROUND

Information systems that communicate sensitive information may require high levels of security. For example, when peers communicate data over a transmission medium and/or communication network (e.g., wireless communication, exchanging Internet Protocol (IP) packets over the Internet, etc.) there may be a risk that a third party (e.g., an adversary) could intercept the communication and obtain access to the data included in the message. If the data being communicated is highly sensitive in nature, such a breach or exploit may comprise valuable information and/or resources.

To prevent unauthorized snooping of communications sent over various types of communication networks, cryptographic techniques may be utilized in order to encode the information in such a manner that it is difficult for parties other than the intended recipient to understand the information being communicated. For example, cryptography may be used to in order to ensure the confidentiality of transmissions, maintain data integrity, authenticate message senders and/or recipients, and/or provide non-repudiation services. Examples of cryptographic applications include computer passwords (e.g., authentication), encryption/decryption techniques, data integrity checks, etc.

As an example, military aircraft may communicate with other aircraft, ground personnel, and/or other equipment. In order to prevent an adversary from intercepting the communications—which may include sensitive data regarding mission details, personnel locations, etc.—the communications may be encrypted prior to being sent over-the-air (OTA). With the emergence of unmanned aerial vehicle (UAVs), the size of some aircraft used to assist the warfighter have become relatively small (e.g., some as small as one kilogram or less). Further there are often power constraints that limit the power available to electronics on such aircraft. It can be difficult to use legacy encryption/decryption techniques under such size and power conditions.

SUMMARY

Disclosed herein are methods and systems for configuring and using one or more programmable child encryption/decryption devices using a parent cryptographic configuration device that maintains long term secrets used to derive cryptographic keys utilized by one or more programmable child encryption/decryption devices. For example, a system for performing one or more of encryption and/or decryption may include a parent cryptographic device. The parent cryptographic device may be configured to receive a first cryptographic key. The parent cryptographic device may be configured to determine one or more session keys based on the first cryptographic key. The parent cryptographic device may be configured to insert the one or more session keys onto one or more child cryptographic devices that are operably connected to the parent cryptographic device. At least one of the one or more child cryptographic devices may be configured to receive the one or more session keys from the parent cryptographic device, and perform one or more of encryption or decryption of communications exchanged with another child cryptographic device of the one or more child cryptographic devices.

As an example, the parent cryptographic device may include a plurality of interfaces for configuring a plurality of child cryptographic devices at substantially the same time. The parent cryptographic device may include one or more anti-tamper hardware mechanisms configured for storing the first cryptographic key. The parent cryptographic device may be configured to perform fail-safe key management functions for the first cryptographic key. Examples of fail-safe key management function include interfacing to a key fill device, authenticating to the key fill device, and receiving the first cryptographic key from the key fill device. If the child cryptographic devices are to be used together, then each of the one or more child cryptographic devices may be inserted with the same session key, for example if symmetric encryption/decryption is to be performed. The parent cryptographic device may be configured to determine that an authenticated cryptographic ignition key (CIK) is interfaced to the parent cryptographic device prior to inserting the one or more session keys onto one or more child cryptographic devices.

The parent cryptographic device may be considered a cryptographic configuration device. For example, the cryptographic configuration device may be configured to load one or more cryptographic keys onto one or more configurable encryption/decryption (E/D) devices (e.g., child cryptographic devices). The cryptographic configuration device may include one or more child interfaces. For example, each child interface may be configured to interface with a respective configurable E/D device. The cryptographic configuration device may include secure tamper memory. For example, the secure tamper memory may be configured to store one or more secret keys, and to clear its memory contents based on operating without power for more than a configured amount of time. The cryptographic configuration device may include a microprocessor. For example, the microprocessor may be configured to perform fail-safe key management for the one or more secret keys. The microprocessor may be configured to derive one or more session keys based on the one or more secrets keys using a one-way function and/or an internal source of random data. The microprocessor may be configured to load the one or more session keys onto at least one of the one or more configurable E/D devices using the one or more child interfaces.

In an example, the cryptographic configuration device may include an operator interface configured to receive inputs and present outputs. For example, the microprocessor may be configured to configure the one or more configurable E/D devices based on inputs received from the operator interface. The operator interface may be configured to receive an input that is indicative of a type of encryption to be performed by the at least one of the one or more configurable E/D devices, and the microprocessor may be configured to configure at least one of the one or more configurable E/D devices to implement the type of encryption indicated. The cryptographic configuration device may include a serial interface configured to be operably connected to a deployed configurable E/D device while the deployed configurable E/D device is operably connected to a communication system for performing at least one of encryption or decryption. For example, the microprocessor may be configured to rekey the deployed configurable E/D device using the serial interface while the deployed configurable E/D device is operably connected to the host communication system. In an example, the microprocessor may be configured to rekey a second configurable E/D device via the deployed configurable E/D device using the serial interface. For example, the cryptographic configuration device may be configured to use the deployed configurable E/D device as a relay for configuring the second configurable E/D device over the air. The one or more configurable E/D devices may be implemented as a field programmable gate array (FPGA), for example packaged as a CompactFlash form factor device, and the one or more child interfaces may each utilize a CompactFlash physical interface.

In an example, a configurable encryption/decryption (E/D) device (e.g., a child cryptographic device) may include an interface connector configured to interface with a cryptographic configuration device and a host communication system bus. The configurable E/D device may include a programmable logic device. The programmable logic device may include one or more logical processing cores and volatile memory. For example, the one or more logical processing cores may be configured to communicate with the cryptographic configuration device via the interface connector. For example, communicating with the cryptographic configuration device may include receiving one or more session keys to be used for at least one of encryption or decryption from the cryptographic configuration device via the interface connector. The one or more logical processing cores may be configured to communicate with a host communication system via the interface connector. For example, communicating with the host communication system may include at least one of transmitting or receiving data over the host communication system bus using the interface connector.

The configurable E/D device may be configured to encrypt data that is received from a processing unit of the host communication system via a plaintext traffic interface of the interface connector using the one or more session keys. The configurable E/D device may be configured to send encrypted data to a radio of the host communication system for transmission via a ciphertext traffic interface of the interface connector. The configurable E/D device may be configured to decrypt data that is received from the radio of the host communication system via the cipherext traffic interface of the interface connector using the one or more session keys. The configurable E/D device may be configured to send decrypted data to the processing unit of the host communication system for processing via the plaintext interface of the interface connector.

The configurable E/D device may include one or more of a battery or a capacitor configured to act as a temporary power supply for a volatile memory region of the programmable logic device. For example, the volatile memory region may be configured to erase data stored in the volatile memory region upon loss of power. The one or more of the battery or the capacitor may be configured to provide power to the volatile memory region for a limited period of time. The configurable E/D device may include a serial interface. The configurable E/D device may be configured to communicate with the cryptographic configuration device via the serial interface while being operably connected to the host communication system via the first interface. The configurable E/D device may be configured to receive one or more new session keys via the serial interface while operably connected to the host communication system via the first interface. The configurable E/D device may be configured to communicate the one or more new session keys to another configurable E/D device via the radio of the host communication system. For example, the configurable E/D device may be configured to encrypt a message including the one or more new session keys using the one or more old session keys.

DETAILED DESCRIPTION

Figure 1:
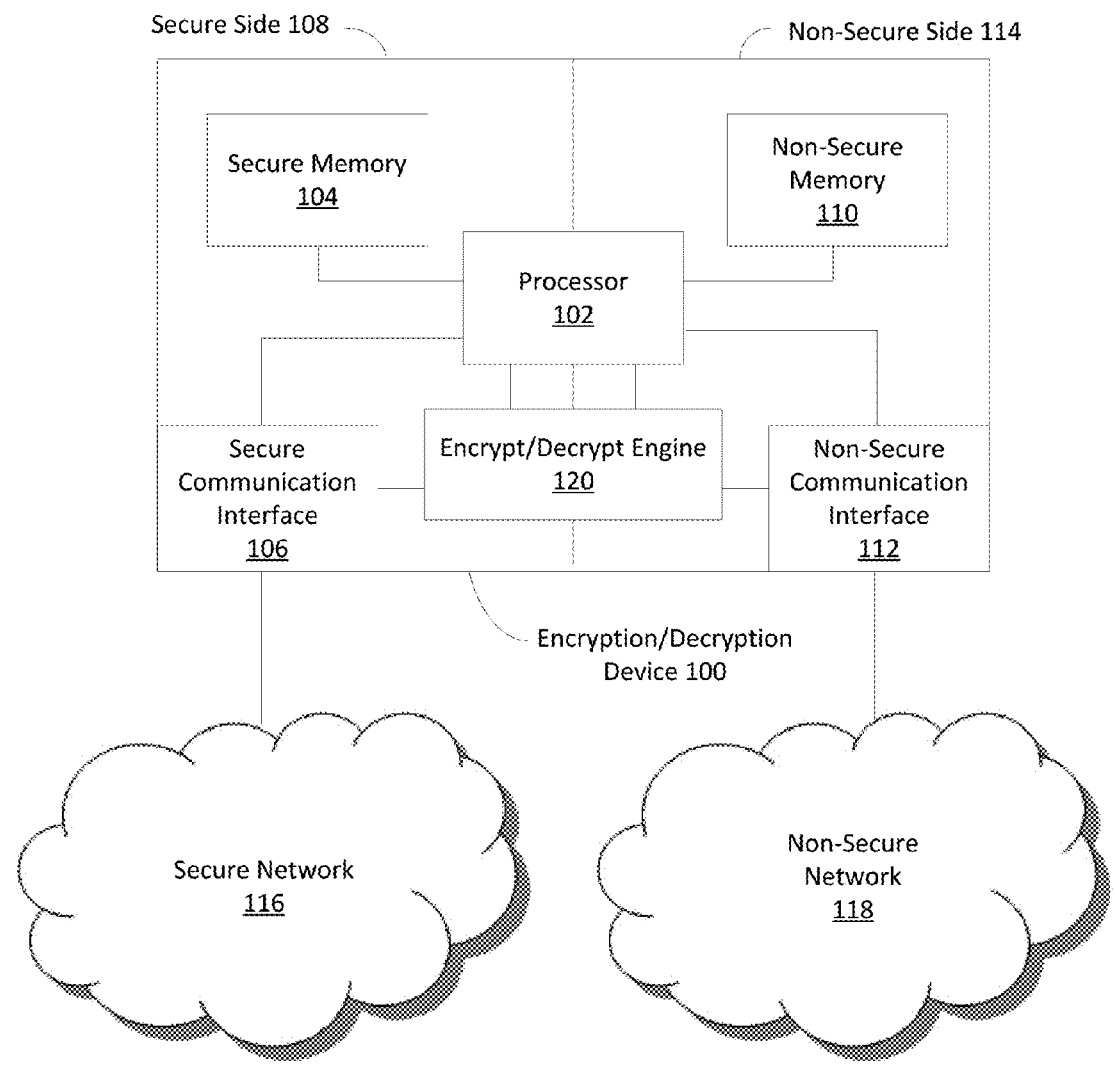
FIG. 1 is a block diagram of an example encryption/decryption (E/D) device.

FIG. 1 is a block diagram of an example of a typical encryption/decryption (E/D) device (e.g., may also be referred to as a cryptographic device). E/D Device 100 may be any device capable of encryption and/or decryption. E/D Device 100 may have one or more communication interfaces. E/D Device 100 may include processor 102. The processor 102 may demarcate an interface between a Secure Side 108 of E/D Device 100 and a Non-Secure Side 114 of E/D Device 100. User data or other sensitive information may be in an encrypted form when stored or communicated on Non-Secure Side 114. The encrypted data may be ciphertext (CT) data, and Non-Secure Side 114 may also be referred to as the CT side. Non-Secure Side 114 may also be known as a Black Side of E/D Device 100. Data stored or communicated on Secure Side 108 may be unencrypted. The unencrypted data may also be referred to as plaintext (PT) data, and Secure Side 108 may also be referred to as the PT side. Secure Side 108 may also be known as a Red Side of E/D Device 100. Although example internal components of E/D Device 100 are shown in FIG. 1 for purposes of illustration, E/D Device 100 may have a variety of internal configurations and may include more or less internal components then those shown in FIG. 1.

Processor 102 may be a general purpose central processing unit (CPU), a digital signal processor, a microcontroller, or the like. Processor 102 may be implemented in various ways, for example using fixed or field programmable gate logic. Processor 102 may include one or more Field Programmable Gate Arrays (FPGAs), which may be configured to perform one or more of the processes disclosed herein. For example, Processor 102 may perform encryption and/or decryption. Processor 102 may provide communication routing functions. In another example, multiple processors may be utilized. A dedicated module, engine, or device, for example Encrypt/Decrypt Engine 120, may perform encryption and/or decryption, while Processor 102 may perform other functions. Encrypt/Decrypt Engine 120 may be a separate processor, or a logical division of Processor 102. For example, data being communicated from Secure Side 108 to Non-Secure Side 114 may be encrypted by Processor 102.

Similarly, data being communicated from Non-Secure Side 114 to Secure Side 108 may be decrypted by Processor 102. In another example, a module within Processor 102 and/or a separate functional block within E/D Device 100, such as Encrypt/Decrypt Engine 120, may perform the encryption and/or decryption. E/D Device 100 may be configured to support Type 1 encryption. For example, E/D Device 100 may be configured to support communication via the HAIPE® protocol. E/D Device 100 may be configured to perform symmetric encryption (e.g., uses the same key to encrypt and decrypt), asymmetric encryption (e.g., uses different keys to encrypt and decrypt), public-key encryption (e.g., the publicly known key is used to encrypt and a private key is used to decrypt), manual encryption (e.g., user input may be utilized), transparent encryption (e.g., user input is not utilized), and/or the like. Encryption may be used with protocols which operate at OSI Layer 3, for example at the IP layer. An example IP layer encryption protocol may be Internet Protocol Security (IPsec). An example of an encryption algorithm that may be used is Advanced Encryption Standard (AES). E/D Device 100 may be configured to perform key establishment and/or discovery, for example communicating via Non-Secure Communication Interface 112 over Non-Secure Network 118.

Secure Side 108 may include Secure Memory 104 and/or Secure Communication Interface 106. Secure memory 104 may be a tangible computer-readable memory, for example semiconductor or solid state memory, magnetic tape, a removable computer diskette, a random access memory (RAM), a read-only memory (ROM), a rigid magnetic disk, an optical disk, a hard drive, and/or a Redundant Array of Independent Disks (RAID). Processor 102 may be configured to execute instructions stored on Secure Memory 104. Processor 102 may store data on Secure Memory 104, for example unencrypted, PT data, and/or may read data from Secure Memory 104.

Processor 102 may communicate with Secure Network 116 via Secure Communication Interface 106. Secure Network 116 may be a trusted network. Data communicated over Secure Network 116 may be in an unencrypted form. Secure Network 116 may include multiple secure subnets. The secure subnets may be a logical division of Secure Network 116. For example, computers communicating locally via network switch or router may be located on the same subnet of Secure Network 116. For example, secure routers included in Secure Network 116 may form the logical demarcation between a plurality of subnets within Secure Network 116. Serial communication may be performed over Secure Network 116.

Secure Communication Interface 106 may be any interface capable of communication with Secure Network 116. Secure Communication Interface 106 may be a network adapter, a serial communication adapter, and/or other type(s) of communication device(s), for example depending on the communication protocol utilized by Secure Network 116. Example network adapters may include cable modems, dial-up modems, wireless network adapters, Ethernet adapters, Ethernet Network Interface Cards (NICs), and the like. A serial network adapter may communicate using one or more of RS-232, Universal Serial Bus (USB), FireWire, and/or the like. Secure Communication Interface 106 may be associated with an IP address and a MAC address. For example, the IP address for Secure Communication Interface 106 may be referred to as the PT IP address for E/D Device 100. Secure Communication Interface 106 may be adapted to perform point-to-point communication and/or network-based communication.

Processor 102 may communicate with Non-Secure Network 118 via Non-Secure Communication Interface 112. Non-Secure Network 118 may be a public network. For example, Non-Secure Network 118 may be the Internet. Non-Secure Network 118 may include a wireless data link. Non-Secure Network 118 may be vulnerable to snooping or other attacks. Data communicated over Non-Secure Network 118 may be in an encrypted form. Non-Secure Network 118 may be used to communicate with other secure networks or secured devices. For example, encrypted messages may be sent to other devices over Non-Secure Network 118 via Non-Secure Communication Interface 112. Non-Secure Communication Interface 112 may be any interface capable of communication with Non-Secure Network 118. Non-Secure Communication Interface 112 may be a network adapter, a serial communication adapter, and/or other type(s) of communication device(s), for example depending on the communication protocol utilized by Non-Secure Network 118. For example, Non-Secure Communication Interface 112 may be a network adapter. Example network adapters may include cable modems, dial-up modems, wireless network adapters, Ethernet adapters, Ethernet Network Interface Cards (NICs), and the like. A serial network adapter may communicate using one or more of RS-232, Universal Serial Bus (USB), FireWire, and/or the like. Non-Secure Communication Interface 112 may be associated with an IP address and a MAC address. For example, the IP address for Non-Secure Communication Interface 112 may be referred to as the CT IP address for E/D Device 100. Non-Secure Communication Interface 112 may be adapted to perform point-to-point communication and/or network-based communication.

As noted above, an E/D device may be configured to use various types of key-based encryption in order to encrypt plaintext data into ciphertext data for transmission. Similarly, an E/D device may be configured to use key-based decryption in order to decrypt ciphertext data to derive plaintext data. In order to establish one or more keys that may be used to perform encryption and/or decryption, a control plane for the cryptographic system may configure the encryption/decryption module for operation. As the level of trust associated with the communication session may be dependent on the identity of one or more of the keys being kept a secret, techniques may be specified for generating session keys and/or otherwise protecting a secret key from being compromised in a fashion that may jeopardize an encrypted communication session.

For example, cryptographic devices to be deployed on UAVs and other devices that may be of relatively small size and/or that may supply relatively little power may be faced with many constraints that may not encountered when designing traditional cryptographic devices. For example, a cryptographic device with a lower Size, Weight, and Power (SWaP) footprint that still achieves a relatively high data throughput may be achieved by using an embeddable cryptographic module that may omit one or more user/manager interfaces used to configure the device and instead may utilize auxiliary configuration equipment in order to establish cryptographic parameters, load cryptographic keys, and/or otherwise configure the cryptographic module for operation. Further, although session key(s) used by the embeddable cryptographic device may be stored locally, by using auxiliary configuration equipment to program the embeddable cryptographic module with the session keys, long-term, highly sensitive secrets (e.g., an secret key used to generate a session key) may be stored in the auxiliary configuration equipment rather than in the embeddable cryptographic device. In this manner, the embeddable cryptographic device may be constructed without the use of anti-tamper protection (e.g., which may include relatively large and/or heavy hardware components), allowing the device to be produced in low SWaP packaging. Similarly, by storing the sensitive long-term secrets outside of the embedded module, fail-safe attributes associated with cryptographic key management (e.g., which may be implemented in hardware) may be performed in the auxiliary configuration equipment rather than the embeddable cryptographic module, further allowing the embeddable cryptographic module to maintain a relatively small SWaP profile.

In order to use an embeddable cryptographic device with a relatively small SWaP profile for encrypting/decrypting user data while still providing adequate levels of assurance that the data being encrypted is protected, the data plane related functions (e.g., encryption, decryption, etc.) of the cryptographic device may be separated from the control plane functions (e.g., key management functions such as fail-safe key management functions). In this manner, the data plane functionality may be implemented on a lightweight, low-power embeddable integrated circuit (e.g., such as a field-programmable gate array (FPGA)), while the control plane related functions may be implemented in a larger, tamper-proof configuration device so that sensitive long-term secrets may be assured adequate levels of protection. The configuration device may include a user interface that may allow the user to configure one or more embeddable cryptographic devices using the control plane included in the configuration device. The one or more embeddable cryptographic modules may be configured for a cryptographic session using the configuration device, and then applied directly to the communication interface to be used for the cryptographic session.

In this manner, a full-service cryptographic module may be implemented as a composite system including a parent device (e.g., the configuration equipment including the control plane) and a child device (e.g., an embeddable cryptographic device in a low SWaP package). The parent device may store long-term sensitive secrets but may not be subject to low SWaP limitations since the parent device does not need to be located on the platform (e.g., UAV) for which the cryptographic session is being established. Instead, the child device may include information used to communicate during a cryptographic session (e.g., cryptographic key(s), cryptographic algorithm logic, etc.) while meeting the desired SWaP requirements. For example, such a separable configuration allows the entire low SWaP budget to be allocated for traffic processing in the child device, allowing for greater data throughput for a given SWaP. Further, the child device may be designed in such a way that additional reductions in SWaP may be achieved, for example by reducing the achievable throughput of the cryptographic module.

In an example, the parent device may be adapted to concurrently configure multiple child devices to be cryptographically interoperable and/or compatible with the end equipment (e.g., compatible with a radio used for the encrypted transmissions). The child devices may be configured in such a way so as to be operable without the use of a user interface when deployed. In an example, the parent device may be used to perform fail-safe key management functions. Examples of fail-safe key management functions that may be performed by the parent device may include one or more of key generation, key distribution via direct connection, key distribution via over-the-air rekey messages (e.g., for dynamically re-keying one or more deployed child devices over-the-air), and/or the like. In an example, the fail-safe key management functions may include the parent cryptographic device interfacing with a key fill device, authenticating itself to the key fill device, and receiving one or more keys from the key fill device based on successfully authenticating itself to the key fill device. For example, the key fill device may be configured to provide keys to a preconfigured group of devices. Members of the group may be required to include certain hardware or other key management features that may ensure adequate levels of protection for the keys provided by the fill device, which may be long term secrets. In order to receive the key from the fill device, the parent cryptographic device may authenticate itself to the fill device. The authentication may demonstrate to the fill device that it meets the specifications for storing a long term secret by successfully authenticating. The parent device may provide anti-tamper protection for itself and/or for its child devices (e.g., prior to deployment) without the imposing a larger SWaP profile on the child device(s). In an example, the parent device may use a known answer test (KAT) and/or some other type of challenge/response test in order to authenticate the child device. For example, the parent device may issue a challenge to the child device, and if the challenge is successfully answered by the child device, the parent device may provide one or more encryption keys to the child device.

Figure 2:
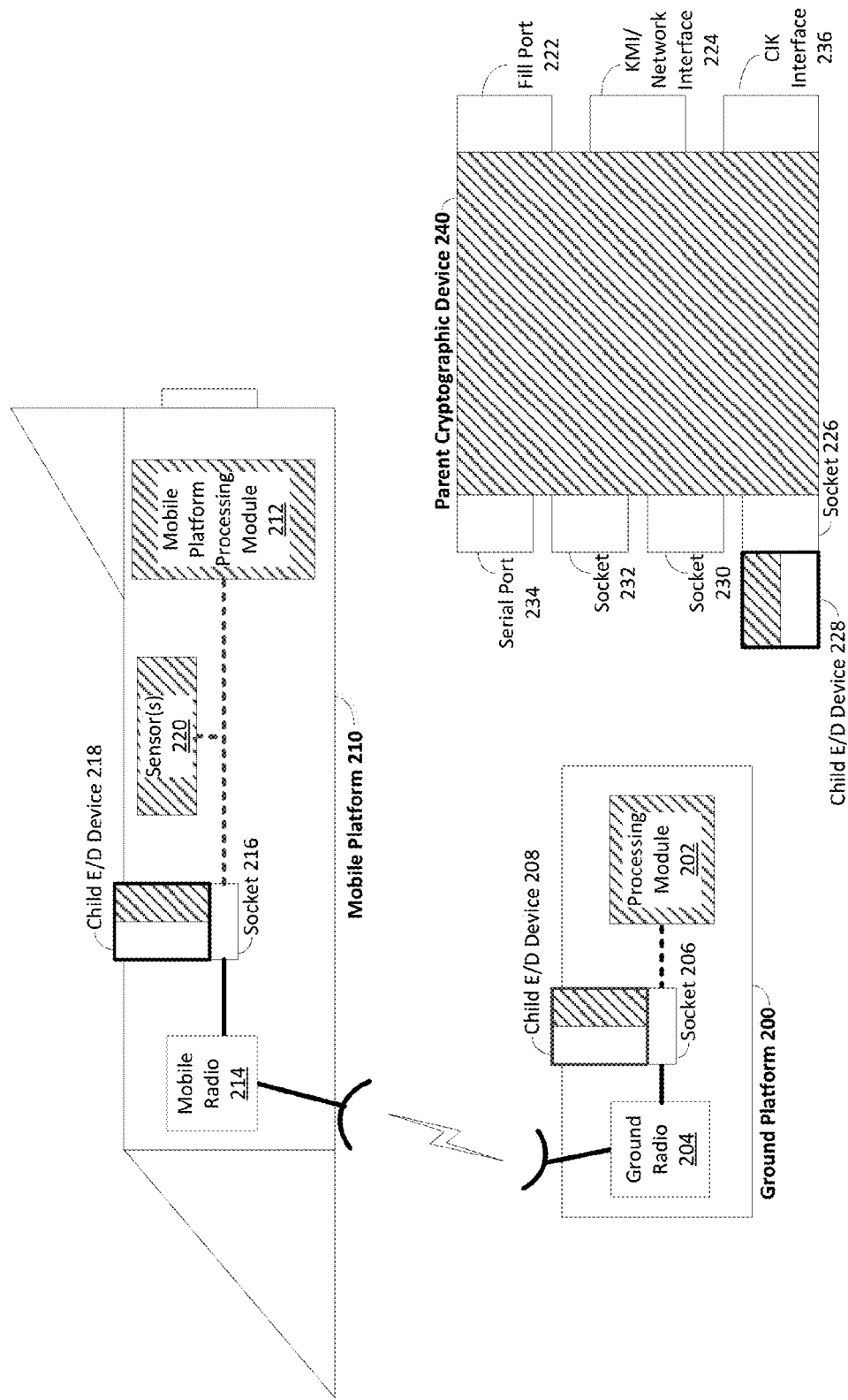
FIG. 2 is an example system diagram including a parent cryptographic device on different child E/D devices deployed on various platforms.

FIG. 2 illustrates an example system utilizing a parent cryptographic device and a child E/D device (e.g., a child cryptographic device). For example, as shown in FIG. 2, Mobile Platform 210 may be any device configured to communicate with Ground Platform 200. For example, Mobile Platform 210 may be an automated vehicle (AV), an unmanned aerial vehicle (UAV), an unmanned underwater vehicle (UUV), an unmanned surface vehicle (USV), an unmanned ground vehicle (UGV), an unmanned spacecraft, a robot, and/or some other unmanned vehicle/drone. In an example, Mobile Platform 210 may be a manned vehicle and/or may be a radio system operated by a user. Although Mobile Platform 210 is shown to be an aerial device in FIG. 2, Mobile Platform 210 may be any device capable of operative communications with a communication peer such as Ground Platform 200.

Ground Platform 200 may be in communication with Mobile Platform 210. Mobile Platform 210 may be controlled by Ground Platform 200. As an example, Mobile Platform 210 may be a UAV, and Ground Platform 200 may be configured to control the operation of Mobile Platform 210 during deployment. In another example, both Mobile Platform 210 and Ground Platform 200 may be handheld radios that are configured to communicate with each other. Although the examples disclosed herein may described with respect to Mobile Platform 210 as a UAV and Ground Platform 200 as a control station for the UAV, as may be appreciated the techniques and systems described herein may be applicable for use with any communication devices for which encryption, decryption, and/or other cryptographic services are desired.

Additionally, although the examples described herein may be expressed in terms of an example point-to-point communication session between a first device (e.g., Ground Platform 200) and a second device (e.g., Mobile Platform 210), the systems and methods described herein may be applicable to other communication architectures, for example communication links utilized by more than two devices. For example, several communication devices (e.g., more than two) may each be provided a with a respective child E/D device in order to operably communicate with other communication devices in an encrypted manner. The same key(s) may be used by each of the devices participating in the communication session and/or some devices within the session may use separate key(s), for example if these devices are exchanging messages that should be encrypted to prevent other members of the communication session from comprehending the message contents.

For example, a first device may be provisioned a child E/D device that is configured with two encryption keys (e.g., Key A and Key B), a second device may be provisioned a child E/D device that is configured with three encryption keys (e.g., Key A and Key C, and Key D), a third device may be provisioned a child E/D device that is configured with two encryption keys (e.g., Key A and Key C), and a fourth device may be provisioned a child E/D device that is configured with three encryption keys (e.g., Key A, Key B, and Key D). Key A may be used for encrypted communications to be exchanged among each and/or any of the members of the communication session. Key B may be used for encrypted communications to be exchanged between the first device and the fourth device. Key C may be used for encrypted communications exchanged between the second device and the third device. Key D may be used for encrypted communications exchanged between the second device and the fourth device. Such a communication architecture is meant as an example, and various combinations of keys may be provided to a plurality of devices in order to establish a plurality of cryptographic sessions between varying numbers of devices.

For example, Mobile Platform 210 may be configured to communicate with Ground Platform 200. For example, Mobile Platform 210 may include Mobile Radio 214. Mobile Radio 214 may be a one-way radio (e.g., configured to receive signals transmitted by Ground Platform 200 or configured to transmit signals to Ground Platform 200) or may be a two-way radio (e.g., configured to transmit and/or receive signals to Ground Platform 200). Mobile Platform 210 may be configured to communicate with one or more other devices using Mobile Radio 214. Mobile Platform 210 may include one or more Sensor(s) 220 for collecting data. For example, Sensor(s) 220 may be configured to collect data regarding the operation of Mobile Platform 210 to be transmitted to Ground Platform 200 via Mobile Radio 214. Sensor(s) 220 may be configured to perform remote sensing in order to collect other information about the environment around Mobile Platform 210 (e.g., using electromagnetic sensors, gamma ray sensors, biological sensors, chemical sensors, temperature sensors, moisture sensors, etc.). Mobile Platform 210 may include Mobile Platform Processing Module 212, which may comprises one or more processing units and/or processors configured to control the operation of Sensor(s) 220 and/or Mobile Radio 214.

Ground Platform 200 may be configured to communicate with Mobile Platform 210 using Ground Radio 204. For example, Processing Module 202 may be configured to control the operation of Ground Radio 204 in order to operably communicate with Mobile Platform 210. Ground Radio 204 may be a one-way radio (e.g., configured to receive signals transmitted by Mobile Platform 210 or configured to transmit signals to Mobile Platform 210) or may be a two-way radio (e.g., configured to transmit and/or receive signals to Mobile Platform 210). Processing Module 202 may be configured to control the operation of Mobile Platform 210 by sending commands and other control instructions to Mobile Platform 210 via Ground Radio 204. Processing Module 202 may comprise one or more processing units and/or processors configured to control the operation of Ground Radio 204 and/or Mobile Platform 210 (e.g., via Ground Radio 204).

Some of the data that is communicated to and/or from Mobile Platform 210 via Mobile Radio 214 may be sensitive in nature. For example, Sensor(s) 220 may collect data that is highly sensitive, such as intelligence data about a certain location. When the sensor data collected by Sensor(s) 220 is communicated to Ground Station 200 (e.g., from Mobile Radio 214 to Ground Radio 204), the sensitive data may be exposed to potential adversaries that may be monitoring the link between Ground Platform 200 and Mobile Platform 210. Similarly, control commands communicated from Ground Platform 200 to Mobile Platform 210 (e.g., from Ground Radio 204 to Mobile Radio 214) may be highly sensitive. In order to prevent one or more adversaries from intercepting the data and/or impersonating one or more of Ground Platform 200 and/or Mobile Platform 210, encryption and decryption may be performed for communications exchanged between Ground Platform 200 and Mobile Platform 210.

However, Mobile Platform 210 may be a relatively small device. For example, Mobile Platform 210 may be unable to support and/or otherwise use components that are larger than a predetermined size and/or weight. Similarly, Mobile Platform 210 may be a relatively low power device. For example, Mobile Platform 210 may be unable to provide greater than a predetermined power threshold to devices included in Mobile Platform 210. Traditional encryption/decryption modules may be too large and/or may consume too much power to be supported by Mobile Platform 210. For example, tamper protection and/or fail-safe key management functionality associated with traditional encryption/decryption devices may cause the traditional encryption/decryption devices to exceed the desired SWaP profile desired for operation on Mobile Platform 210.

In order to allow for encryption and/or decryption to be performed at Mobile Platform 210 without exceeding the SWaP requirements for Mobile Platform 210, Child E/D Device 218 may be installed at Mobile Device 210, for example via Socket 216. Similarly, Child E/D Device 208 may be installed at Ground Platform 200, for example via Socket 206. Child E/D Device 208 and/or Child E/D Device 218 may be configured to provide encryption and/or decryption services. For example, as shown in FIG. 2, solid lines may represent communication channels over which the transmitted data is in an encrypted form (e.g., the Black Side or CT Side). Dashed lines and hashed elements may correspond to components and/or communication channels wherein sensitive data is present in an unencrypted form (e.g., Red Side or PT Side). Prior to communicating data sent from Mobile Platform 210 over the air (e.g., via Mobile Radio 214), the data may be encrypted using Child E/D Device 218. Prior to communicating data sent from Mobile Platform 200 over the air (e.g., via Ground Radio 204), the data may be encrypted using Child E/D Device 208.

Prior to deploying Child E/D Device 208 in Ground Platform 200 and/or Child E/D Device 218 in Mobile Platform 210, Parent Cryptographic Device 240 may be used to configure one or more of Child E/D Device 208 and/or Child E/D Device 218 (e.g., and/or Child E/D Device 228). For example, in order to limit the SWaP profile of Child E/D Device 208 and/or Child E/D Device 218, one or more of the control related aspects for encryption/decryption for Child E/D Device 208 and/or Child E/D Device 218 may be performed in Parent Cryptographic Device 240. For example, Parent Cryptographic Device 240 may be configured to store one or more long term secrets used to generate sessions keys used for encryption by one or more of Child E/D Device 208 and/or Child E/D Device 218. Since Parent Cryptographic Device 240 may be configured to store the long term secrets (e.g., a secret key that is used to generate sessions keys) one or more control related functions and/or components such as anti-tamper protection, fail-safe key management modules, interface(s) for key fills, user interface, interface(s) for cryptographic ignition key (CIK), and/or the like may be implemented on Parent Cryptographic Device 240 for supporting encryption/decryption performed by one or more of Child E/D Device 208, Child E/D Device 218, and/or Child E/D Device 228. By implementing the control function(s) in Parent Cryptographic Device 240, after Child E/D Device 208 and/or Child E/D Device 218 have been properly configured for data encryption/decryption, Child E/D Device 208 and/or Child E/D Device 218 may be separated from Parent Cryptographic Device 240 and installed at Ground Platform 200 and Mobile Platform 210, respectively.

In order to configure one or more of Child E/D Device 208, Child E/D Device 218, and/or Child E/D Device 228 to perform encryption and/or decryption, the child E/D devices to be configured may be operably connected to Parent Cryptographic Device 240. For example, Child E/D Device 208 may be operably connected to Parent Cryptographic Device 240 via Socket 232. Child E/D Device 218 may be operably connected to Parent Cryptographic Device 240 via Socket 230. Child E/D Device 228 may be operably connected to Parent Cryptographic Device 240 via Socket 226. Socket 226, Socket 230, and/or Socket 232 (e.g., and/or Socket 206 and/or Socket 216) may be CompactFlash physical sockets, for example if Child E/D Device 208, Child E/D Device 218, and/or Child E/D Device 228 are implemented as CompactFlash form factor device(s). Other types of sockets may be used depending on the form factor of Child E/D Device 208, Child E/D Device 218, and/or Child E/D Device 228.

Once the child E/D devices to be configured (e.g., Child E/D Device 208, Child E/D Device 218, and/or Child E/D Device 228) have been operably connected to Parent Cryptographic Device 240, Parent Cryptographic Device 204 may be triggered to begin configuring the devices for encryption/decryption operation. For example, the Parent Cryptographic Device 240 may include a user interface that may allow the user to specify one or more child E/D devices to be configured and/or the encryption/decryption preferences for the desired configuration.

Note that one or more of the configuration steps for configuring the child E/D device(s) may be performed using the Parent Cryptographic Device 240 without the child E/D device(s) being connected to Parent Cryptographic Device 240. For example, Parent Cryptographic Device 240 may perform a cryptographic fill procedure with or without the child E/D devices being connected to Parent Cryptographic Device 240. For example, Parent Cryptographic Device 240 may use Fill Port 222 to perform a cryptographic fill procedure. The fill procedure may be used to load one or more short term and/or long term secret keys on Parent Cryptographic Device 240. For example, a fill device may be operably connected to Parent Cryptographic Device 240 using Fill Port 222. Fill Port 222 may be an interface configured for performing a key fill procedure, such as using a DS-101 protocol and/or a DS-102 protocol. As an example, Fill Port 222 may include a 6-pin U-229 connector for interfacing with a fill device. The fill device may load Parent Cryptographic Device 240 with one or more cryptographic algorithms and/or one or more cryptographic keys. Examples of fill devices may include an AN/CYZ-10 Data Transfer Device, a KYK-13 Electronic Transfer Device, an AN/PYQ-10 Simple Key Loader (SKL), a KIK-30 Really Simple Key Loader (RASKL), and/or the like.

When performing a key fill procedure, the user of Parent Cryptographic Device 240 may be prompted or otherwise compelled to authenticate their user identity to Parent Cryptographic Device 240 in order to receive the key fill. For example, Crypto-Ignition Key (CIK) Interface 236 may be used as an interface for received a CIK associated with the user of Parent Cryptographic Device 240. The CIK may store an electronic password and/or key that indicates that the user or operator of Parent Cryptographic Device 240 (e.g., the person that inserted the CIK) is authorized to use Parent Cryptographic Device 240 and/or receive secret keys using Fill Port 222. An example of a CIK may be the KSD-64 CIK, the KSD-64A CIK, and/or the like. Rather than or in addition to using a CIK to authenticate the operator, other authentication techniques such as entering a password via a user interface, using secure token, and/or the like may be used.

Rather than or in addition to key fill procedures, Key Management Infrastructure (KMI)/Network Interface 224 may be used to receive, update, and/or otherwise maintain one or more keys as valid. For example, KMI/Network Interface 224 may be used to interface with a KMI network in order to perform one or more key management functions such as fail-safe key management functions, key exchange, communicating with a key management facility, and/or the like. By including one or more of the interfaces used for performing key management in Parent Cryptographic Device 240 (e.g., Fill Port 222, KMI/Network Interface 224, CIK Interface 236, etc.), rather than in the child E/D devices that are configured to perform the actual encryption/decryption, the SWaP profile of the child E/D devices may be maintained at a relatively low level.

In order to configure the child E/D devices for operation/deployment, Parent Cryptographic Device 240 may use one or more long term secret keys for determining session keys that may be used for a given communication session. As an example, Parent Cryptographic Device 240 may be loaded with one or more long term secret keys using one or more of Fill Port 222, KMI/Network Interface 224, and/or CIK Interface 236. The long term secret keys may be highly sensitive and/or may be provisioned by an entity that requires the long term secret keys to be stored according to specified standards (e.g., tamper protection, key management functionality should be performed, etc.). Parent Cryptographic Device 240 may perform the key management functionality as specified by the provisioning entity. In an example, the one or more session key may be derived from random data generated included in Parent Cryptographic Device 240. For example, for some applications rather than using a long term secret to derive the session key(s), Parent Cryptographic Device 240 may use a random number generator and/or another random number source to generate the session keys to be provided to the child E/D device(s).

In an example, the long term secret keys stored in Parent Cryptographic Device 240 may be used to create session keys to be loaded onto one or more child E/D devices (e.g., one or more of Child E/D Device 208, Child E/D Device 218, and/or Child E/D Device 228). As an example, Parent Cryptographic Device 240 may configured two child E/D Devices (e.g., Child E/D Device 208 and Child E/D Device 218) with keys utilized to perform a symmetric encryption session. Although the following example may be described with regards to configured two child E/D devices for performing a symmetric encryption session, more or less than two child E/D devices may be configured by Parent Cryptographic Device 240 and/or the child E/D Devices may be configured for other cryptographic functions/sessions (e.g., asymmetric encryption sessions, public-key encryption sessions, signature checking, performing hash functions, random number generation, and/or the like). Parent Cryptographic Device 240 may configure Child E/D Device 208 and Child E/D Device 218 to implement one or more cryptographic modes such as Cipher Block Chaining, Galois Counter Mode, Long Cycle Mode, encryption/decryption for Communication Security (COMSEC), encryption/decryption for Transmission Security (TRANSEC), and/or the like.

As an example, if Parent Cryptographic Device 240 is to configure Child E/D Device 208 and Child E/D Device 218 for a symmetric encryption session, Parent Cryptographic Device 240 may configure Child E/D Device 208 and Child E/D Device 218 by loading an encryption algorithm onto each of configure Child E/D Device 208 and Child E/D Device 218. In order to load the cryptographic algorithm, Child E/D Device 208 may be operably connected to Socket 232 and/or Child E/D Device 218 may be operably connected to Socket 230. A symmetric key algorithm such as the Advanced Encryption Standard (AES) may be loaded onto Child E/D Device 208 and Child E/D Device 218. Rather than or in addition to AES, other symmetric key algorithms such as MEDLEY, KEESEE, Twofish, Serpent, Blowfish, CASTS, RC4, Triple Data Encryption Standard (3DES), International Data Encryption Algorithm (IDEA), and/or the like may be used. In an example, the cryptographic algorithm to be used may already have been loaded onto Child E/D Device 208 and/or Child E/D Device 218, and Parent Cryptographic Device 240 may load encryption parameters to use with the algorithm on Child E/D Device 208 and/or Child E/D Device 218.

Parent Cryptographic Device 240 may use one or more techniques in order to derive session keys to load onto Child E/D Device 208 and/or Child E/D Device 218. For example, Parent Cryptographic Device 240 may use a hash function in order to derive a session key based on one or more long term secret keys stored in Parent Cryptographic Device 240. As an example, Parent Cryptographic Device 240 may use one or more of the long term secret keys as a seed for a hash function and the output of the hash function may be used as a session key. In order to generate different session keys for different sessions, a random number may be concatenated with the one or more long term secret keys to be used for generating the session keys. The random number and one or more long term secret keys may then be used as the seed for the hash function. The output of the hash function may be used as the session key. For example, a hash function such as SHA-1 and/or SHA-2 may be used. Since the output of the hash function may be more bits than are to be used for the session key (e.g., SHA-2 output may be 384 bits and a AES key may be 128 bits or 256 bits), a portion of the hash output may be used for the session key (e.g., the first 256 bits, the final 256 bits, 128 bits chosen randomly and/or according to a predefined rule, etc.). Other hash functions may be used.

In another example, other key derivation and/or key diversification functions may be used to generate the session key based on the one or more long term secret keys. For example, key stretching, key strengthening, and/or the like may be used. For example, one or more types of pseudo-random functions (e.g., hash function, cryptographic hash function, cipher, etc.) and/or one-way functions (e.g., a function for which it is computationally difficult and/or practically impossible to determine inputs based on analysis of outputs) may be used to generate the session key based on the long term secret key and a random number.

In an example, once the session key(s) have been generated by Parent Cryptographic Device 240, the session key(s) may be loaded onto Child E/D Device 208 and Child E/D Device 218. For example, Child E/D Device 208 and Child E/D Device 218 may each be applied to a peer entity of a communication session, and if symmetric encryption is to be utilized, each of Child E/D Device 208 and Child E/D Device 218 may be loaded with the same session key(s) to be used for encryption/decryption during the symmetrically encrypted session. For example, once Child E/D Device 208 and Child E/D Device 218 have been loaded with the session key(s) by Parent Cryptographic Device 240, Child E/D Device 208 may be installed on Ground Platform 200 (e.g., using Socket 206) and Child E/D Device 218 may be installed on Mobile Platform 210 (e.g., using Socket 216).

Once installed in Mobile Platform 210, Child E/D Device 218 may utilize the installed session key(s) for encrypting and/or decrypting communications sent and/or received from Mobile Radio 214. For example, Mobile Platform Processing Module 212 and/or one or more Sensor(s) 220 may generate data to be transmitted to Ground Platform 200. When sent over an untrusted transmission medium such as the air, the data to be transmitted may be encrypted. For example, Child E/D Device 218 may receive the data to be transmitted via its plaintext interface (e.g., secure interface, red interface, etc.), and may encrypt the data using the one or more session key(s) loaded by Parent Cryptographic Device 240. The encryption algorithm used may have been loaded by Parent Cryptographic Device 240 and/or may have been pre-installed on Child E/D Device 218 (e.g., was installed prior to loading the session key(s)). After encryption, the encrypted data may be sent to Mobile Radio 214 for transmission, for example using a ciphertext interface (e.g., non-secure interface, black interface, etc.) for Child E/D Device 218.

Data received using Mobile Radio 214 (e.g., from Ground Platform 200) may be encrypted. The encrypted data may be received by Child E/D Device 218 via its ciphertext interface (e.g., non-secure interface, black interface, etc.). Child E/D device 218 may decrypt the received data using the one or more session key(s) loaded by Parent Cryptographic Device 240. The decryption algorithm used may have been loaded by Parent Cryptographic Device 240 and/or may have been pre-installed on Child E/D Device 218 (e.g., was installed prior to loading the session key(s)). After decryption, the decrypted data may be sent to Mobile Platform Processing Module 212 for processing, for example using the plaintext interface (e.g., secure interface, red interface, etc.).

Similarly, once installed in Ground Platform 210, Child E/D Device 208 may utilize the installed session key(s) for encrypting and/or decrypting communications sent and/or received from Ground Radio 204. For example, Processing Module 202 may generate data to be transmitted to Mobile Platform 210. When sent over an untrusted transmission medium such as the air, the data to be transmitted may be encrypted. For example, Child E/D Device 208 may receive the data to be transmitted via its plaintext interface (e.g., secure interface, red interface, etc.), and may encrypt the data using the one or more session key(s) loaded by Parent Cryptographic Device 240. The encryption algorithm used may have been loaded by Parent Cryptographic Device 240 and/or may have been pre-installed on Child E/D Device 208 (e.g., was installed prior to loading the session key(s)). After encryption, the encrypted data may be sent to Ground Radio 204 for transmission, for example using a ciphertext interface (e.g., non-secure interface, black interface, etc.) for Child E/D Device 208.

Data received using Ground Radio 204 (e.g., from Mobile Platform 210) may be encrypted. The encrypted data may be received by Child E/D Device 208 via its ciphertext interface (e.g., non-secure interface, black interface, etc.). Child E/D device 208 may decrypt the received data using the one or more session key(s) loaded by Parent Cryptographic Device 240. The decryption algorithm used may have been loaded by Parent Cryptographic Device 240 and/or may have been pre-installed on Child E/D Device 208 (e.g., was installed prior to loading the session key(s)). After decryption, the decrypted data may be sent to Processing Module 202 for processing, for example using the plaintext interface (e.g., secure interface, red interface, etc.).

By utilizing the session key(s) that are derived based on a long term secret, cryptographic keys that are based on a provisioned long term secret may be used for encrypting/decrypting transmission sent and/or received by Mobile Platform 210 without compromising the long term secrets. For example, since certain types of tamper resistance and/or key management functions may be performed in order to maintain the long term secrets as valid, the Parent Cryptographic Device may be used to ensure requirements related to long term secrets are met, while the Child E/D Devices may be manufactured to meet the SWaP specifications for use on relatively small mobile platforms. Additionally, if a mobile platform is captured and/or compromised during a mission, even if the session keys used for that mission are compromised, the long term secret may be safe as it is not stored on the Child E/D Devices. In this manner, the strength, robustness, and/or security provided by a long term secret may be leveraged for generation of one or more session keys that, if compromised, do not jeopardize the integrity of the long term secret. Moreover, the Child E/D Devices may be manufactured to a relatively small form factor, allowing the child E/D devices, to be installed on a variety of platforms, including those with stringent SWaP requirements.

Figure 3:
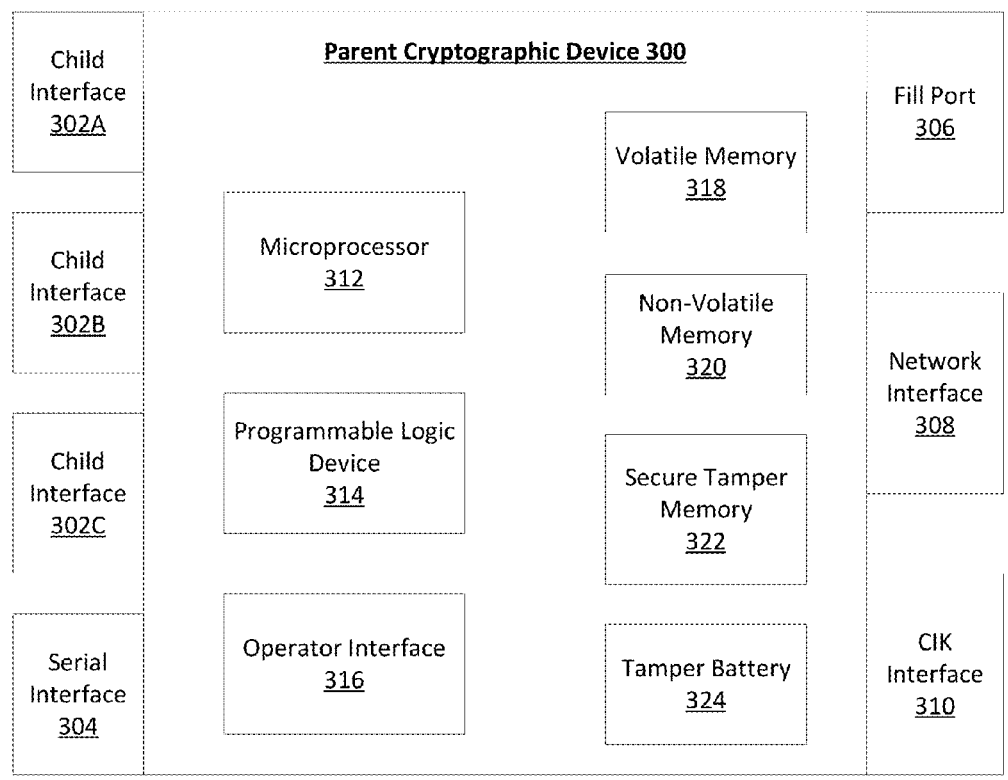
FIG. 3 is a block diagram of an example parent cryptographic device.

FIG. 3 illustrates an example of a parent cryptographic device. For example, Parent Cryptographic Device 300 parent device may include functionality for secure start-up, for example where the validity of functional (e.g., software) components and/or the proper functioning of hardware components may be verified in a trusted boot and and/or a self-testing process. Parent Cryptographic Device 300 may include Secure Tamper Memory 322, for example to store one or more long term secrets. Secure Tamper Memory 322 may provide one or more layers of physical level security for protecting the long term secrets. As an example, Secure Tamper Memory 322 may zeroize or otherwise clear its contents after a predetermined period of time has elapsed without being powered. For example, Tamper Battery 324 may provide continuous and/or near continuous power to Secure Tamper Memory 322. If Secure Tamper Memory 322 is unpowered for more than the predetermined threshold, Secure Tamper Memory 322 may be zerioized or otherwise cleared (e.g., erasing the long term secrets). Secure Tamper Memory 322 may be configured such that its memory contents are clear upon physical or electrical intrusion into an anti-tamper compartment for Secure Tamper Memory 322 and/or for Parent Cryptographic Device 300. Other examples of tamper resistant functions that may be implemented by Secure Tamper Memory 322 may include one or more of resistance to data imprinting (e.g., preventing previously stored information from being extracted), an oscillator for tamper monitoring, and/or the like.

Parent Cryptographic Device 300 may include Microprocessor 312, for example to perform one or more functions related to configuring itself (e.g., Parent Cryptographic Device 300) and/or a child E/D device. Microprocessor 312 may include one or more hardware-based Memory Management Units (MMUs), for example to provide access control and/or least privilege features to the software running on Parent Cryptographic Device 300. The access control and/or least privileged features may be utilized to limit access to Secure Tamper Memory 322 for applications associated with privileges that should not access Secure Tamper Memory 322. Microprocessor 312 may control Operator Interface 316, may receive user inputs via Operator Interface 316, and/or may present outputs via Operator Interface 316. For example, Operator Interface 316 may be a touchscreen display that may be used by the operator in order to trigger Parent Cryptographic Device 300 to configured one or more child E/D devices. For example, Operator Interface 316 may be used to specify the types of encryption to be performed using one or more child E/D devices, the type and/or number of session key(s) to be generated for use on one or more child E/D devices, and/or inputs/outputs related to the maintenance of long term secrets stored in Parent Cryptographic Device 300.

Parent Cryptographic Device 300 may be implemented in a portable, hand-held unit approximately the size and/or shape of a smartphone or other handheld device. Parent Cryptographic Device 300 may be ruggedized for tactical use in the field, for example to provide additional tamper protection and/or protect the device from rough conditions in dangerous environments. Parent Cryptographic Device 300 may include Volatile Memory 318 and/or Non-Volatile Memory 320. For example, Non-Volatile Memory 320 may be configured to store processor executable instructions for one or more methods and/or applications to be executed by Microprocessor 312. The computer executable instructions may be loaded into Volatile Memory 318 (e.g., Random Access Memory (RAM)), prior to execution by Microprocessor 312. Parent Cryptographic Device 300 may include Programmable Logic Device 314. Programmable Logic Device 314 may be adapted to provide a second physical device used to meet Fail-Safe requirements (e.g., Fail-Safe requirements for maintaining long term secrets). For example, one or more actions may be executed by Microprocessor 312 (e.g., cryptographic key maintenance, configuring a child E/D device, etc.) and Programmable Logic Device 314 may be configured to verify that Microprocessor 312 is operating correctly and/or according to predefined rules. In an example, one or more functions that may be performed by Microprocessor 312 may be performed by Programmable Logic Device 314 (e.g., an FPGA configured to perform the function in hardware) because such processing may be performed faster in a programmable hardware device, such processing may be implemented redundantly (e.g., some tasks that are repeated regularly may be performed more efficiently using a programmable hardware device), and/or for Fail-Safe reasons.

Parent Cryptographic Device 300 may include various input/output ports. For example, Parent Cryptographic Device 300 may include one or more child interfaces (e.g., Child Interface 302A, Child Interface 302B, Child Interface 302C, etc.) for configuring child E/D devices and/or otherwise loading child E/D devices with one or more session keys. Parent Cryptographic Device 300 may include Serial Interface 203, while may be used to remotely configure, control, and/or otherwise communicate with one or more child E/D devices. For example, a child E/D device may be installed on a platform that also includes a serial interface. A serial connection may be established between the platform and Parent Cryptographic Device 300, for example using Serial Interface 304. The serial connection may then be used by Parent Cryptographic Device 300 in order to control and/or otherwise configured the child E/D device in a substantially similar manner as if the child interface was operably connected to a child interface (e.g., Child Interface 302A, Child Interface 302B, Child Interface 302C, etc.).

Fill Key Port 306 may be used to support key filling operation of long term secrets, for example using a DS-101 and/or DS-102 protocol. Network Interface 308 may be used to connection and/or otherwise communicate over one or more local and/or wide area networks. CIK Interface 310 may be used to ensure that the operator of Parent Cryptographic Device 300 is authenticated as being allowed to operate Parent Cryptographic Device 300 (e.g., allowed to configure child E/D devices) and/or allowed to provision session keys to one or more child E/D devices. For example, prior to provisioning a session key to one or more child E/D devices, Parent Cryptographic Device 300 may ensure a proper CIK is inserting to CIK Interface 310. For example, the CIK may be an I²C CIK and/or a Universal Serial Bus (USB) CIK.

Parent Cryptographic Device 300 may be designed for one-time use, designed for re-use over a limited time, and/or designed for long term re-use. Depending on the length of time that Parent Cryptographic Device 300 is planning on being deployed, the components of Parent Cryptographic Device 300 and/or the materials used for Parent Cryptographic Device 300 may vary.

Figure 4:
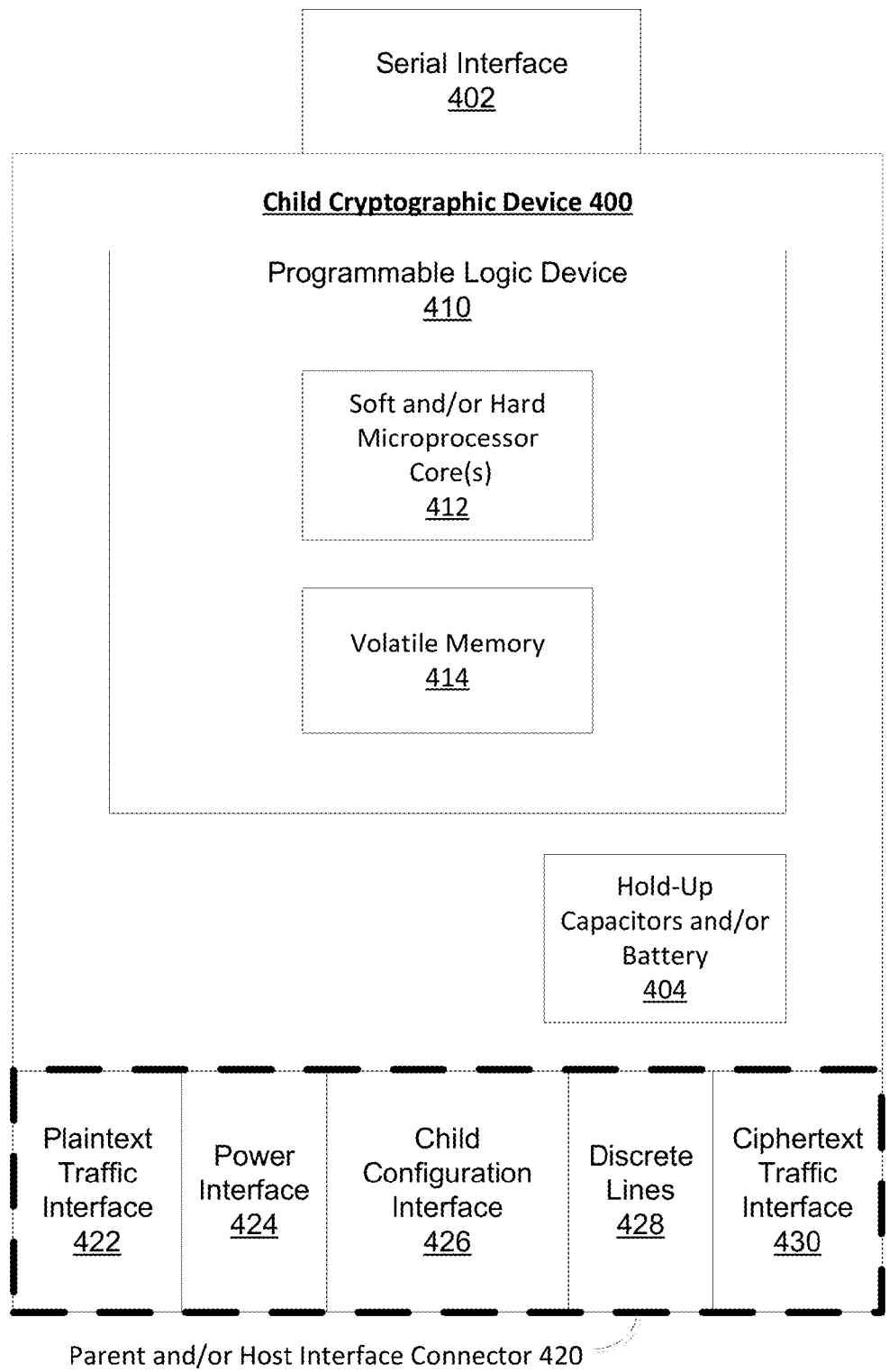
FIG. 4 is a block diagram of an example child cryptographic device.

FIG. 4 illustrates an example of a child cryptographic device. In an example, Child Cryptographic Device 400 may be implemented as a CompactFlash form factor device. For example, Child Cryptographic Device 400 may be implemented using a low-power, FPGA configured to perform various cryptographic functions. For example, Child Cryptographic Device 400 may include Programmable Logic Device 410 (e.g., FPGA) that may be configured as one of more Soft and/or Hard Microprocessor Core(s) 412 and/or Volatile Memory 414. Soft and/or Hard Microprocessor Core(s) 412 may be configured to perform one or more encryption and/or decryption functions, for example using a processor such as Soft and/or Hard Microprocessor Core(s) 412. If a programmable logic device/FPGA is used to construct Child Cryptographic Device 400, the FPGA may designed to be relatively low power, for example may containing a soft-core ARM processor for Soft and/or Hard Microprocessor Core(s) 412 (e.g., or an equivalent application specific integrated circuit (ASIC)). Child Cryptographic Device 400 may be configured to provide traffic throughput of 10 Mb/sec or more at sub-200 mW power consumption. Child Cryptographic Device 400 may be constructed using a CompactFlash 50-pin package (e.g., or similar) and may weigh less than 20 grams.

Although not shown in FIG. 4, Child Cryptographic Device 400 may include non-volatile memory (e.g., for example configured from Programmable Logic Device 410) that may be used for storing configuration data for encryption/decryption and/or logic for performing one or more functions described herein.

In an example, in order to attempt to prevent sensitive information stored on Child Cryptographic Device 400 from being improperly copied, Child Cryptographic Device 400 may be configured with one or more anti-tampering functions. For example, Child Cryptographic Device 400 may be configured to zeroize and/or otherwise clear its memory (e.g., one or more of Volatile Memory 414 and/or Programmable Logic Device 410) if Child Cryptographic Device 400 is not powered for a predetermined period of time. For example, Hold-Up Capacitors and/or Battery 404 may be configured to provide a predetermined amount of energy for Child Cryptographic Device 400. When Child Cryptographic Device 400 is not connected to an external power source, Child Cryptographic Device 400 may use Hold-Up Capacitors and/or Battery 404 as an energy source for powering Volatile Memory 414. Volatile Memory 414 may be used to store sensitive data such as one or more cryptographic session keys and/or one or more encryption/decryption algorithms. If a predetermined amount of time passes during which Child Cryptographic Device 400 is drawing power from Hold-Up Capacitors and/or Battery 404 (e.g., and no an external power source), Hold-Up Capacitors and/or Battery 404 may discharge the entirety of its stored energy, causing a loss of power to Volatile Memory 414 (e.g., and/or other components of Child Cryptographic Device 400). As a result, the contents of Volatile Memory 414 may be cleared or erased. In this manner, any sensitive data stored on Child Cryptographic Device 400 may be erased if Child Cryptographic Device 400 is not powered using an external power source for more than a predetermined length of time. The parameters of Hold-Up Capacitors and/or Battery 404 may be selected such that Volatile Memory 414 may be maintained for a chosen or selected amount of time without Child Cryptographic Device 400 being connected to an external power source.

Child Cryptographic Device 400 may include Parent and/or Host Interface Connector 420. Parent and/or Host Interface Connector 420 may be configured to interface with various sockets on a parent cryptographic device that is used to configure Child Cryptographic Device 400 and/or one or more communication systems that use Child Cryptographic Device 400 for encrypting and/or decrypting data traffic. For example, Parent and/or Host Interface Connector 420 may include various interfaces for being configured by a parent cryptographic device and/or for encrypting/decrypting transmission bitstreams. Parent and/or Host Interface Connector 420 may include Child Configuration Interface 426, which may be used for interfacing with a parent cryptographic device in order to configure Child Cryptographic Device with one or more cryptographic session keys and/or one or more cryptographic algorithms.

Parent and/or Host Interface Connector 420 may include Power Interface 424. When connected to a parent cryptographic device and/or a host system that utilizes Child Cryptographic Device 400 for encryption/decryption, Child Cryptographic Device may draw power using Power Interface 424. Parent and/or Host Interface Connector 420 may include Plaintext Traffic Interface 422 and/or Ciphertext Traffic Interface 430 for communicating unencrypted and/or encrypted data, respectively. For example, when interfacing with a host communication system that uses Child Cryptographic Device 400 for encryption/decryption, Child Cryptographic Device 400 may locally send and/or receive unencrypted data using Plaintext Traffic Interface 422. Similarly, encrypted data (e.g., data encrypted using one or more session keys loaded on Child Cryptographic Interface 400), may be sent and/or received using Ciphertext Traffic Interface 430. Parent and/or Host Interface Connector 420 may also include Discrete Lines 428, which may include one or more electrical lines that are dedicated for communicating information for one or more discrete functions (e.g., rather than user data and/or other data streams). For example, Discrete Lines 428 may include an electrical line that is used to provide a zeroization signal (e.g., trigger Child Cryptographic Device 400 to clear memory and/or clear cryptographic keys). Discrete Lines 428 may include an electrical line that is used to indicate a status, for example to device an external status light emitting diode (LED) indicator.

Child Cryptographic Device 400 may include Serial Interface 402. For example, Serial Interface 402 may be used such that a parent cryptographic device may remotely configure Child Cryptographic Device 400. For example, Serial Interface 402 may be used such that one or more child cryptographic devices (e.g., including Child Cryptographic Device 400) may be rekeyed after deployment. As an example, Serial Interface 402 may be used as part an over-the-air re-keying (OTAR) procedure for one or more child cryptographic devices.

Figure 5:
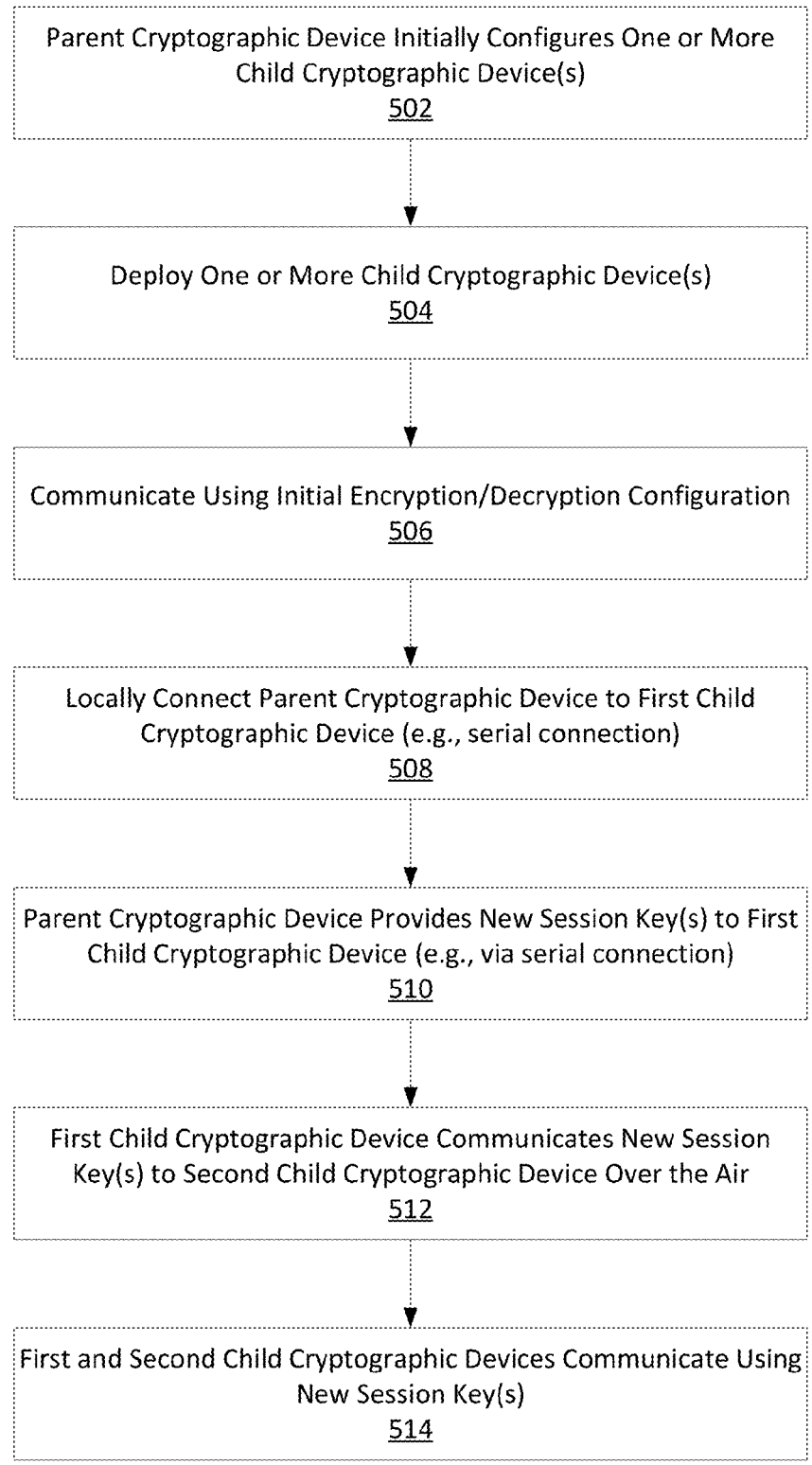
FIG. 5 is flow chart illustrating an example method for performing over the air rekeying (OTAR) of a deployed child cryptographic device.

FIG. 5 is a flow chart illustrating an example OTAR procedure that may be performed for one or more child cryptographic (e.g., encryption/decryption) devices. For example, at 502 a parent cryptographic device may configure one or more child cryptographic devices to perform encryption and/or decryption. For example, the parent cryptographic device may load one or more session keys onto the one or more child cryptographic devices using sockets or other interfaces. The parent cryptographic device may load one or more encryption/decryption algorithms onto the one or more child cryptographic devices, or the algorithm(s) may have been previously loaded onto the child cryptographic device(s).

Once the child cryptographic device(s) have been configured for use (e.g., using the same cryptographic session key(s) if symmetric encryption/decryption is to be used, for example), at 504 the child cryptographic devices may deployed to the communications systems for which encryption/decryption is to be performed. For example, a first child cryptographic device may be installed at a first radio (e.g., at a ground platform), and a second child cryptographic device may be installed at a second radio (e.g., at a mobile platform). Once installed at the first and second radios, at 506 the radios may begin communicating using encryption/decryption performed by the child cryptographic devices. The keys utilized by the child cryptographic devices may be those loaded onto the child cryptographic devices during their initial configuration by the parent cryptographic device.

A user of one or more of the child cryptographic devices may determine to rekey the child cryptographic devices after deployment. For example, after performing the initial configuration of the child cryptographic devices and installing the child cryptographic devices at their corresponding radios, the user may determine that rekeying is appropriate. However, one or more of the child cryptographic devices may be installed at a radio that is remote from the user. For example, one of the child cryptographic devices may be installed on a mobile platform that is currently remote from the user. As an example, the mobile platform may currently be flying a mission. In this scenario, it may be infeasible to rekey the remote child cryptographic device using a local connection to a parent cryptographic device.

In such a scenario, the parent cryptographic device may be used to rekey one or more child cryptographic devices over the air. For example, at 508 the parent cryptographic device may be locally connected to a first child cryptographic device that is installed at a first radio. For example, a serial connection may be established between the parent cryptographic device and the child cryptographic device that is installed at the first radio. The local connection may be a serial interface connection, and the local connection may be established while the child cryptographic device is encrypting and/or decrypting traffic on behalf of the first radio. Thus, the rekeying may be performed while the child encryption decryption device is currently performing encryption/decryption in the field.

One the parent cryptographic device has been connected to the first child cryptographic device, one or more authentication procedures may be performed between the child cryptographic device and the parent cryptographic device. For example, the child cryptographic device may determine that the serially connected parent cryptographic device is a device that is authorized to perform the reconfiguration and/or is the same parent cryptographic device that performed its initial configuration. The parent cryptographic device may determine that the serially connected child cryptographic device is a device that is authorized to perform the reconfiguration and/or is a child cryptographic device that was previously validly configured by the parent cryptographic device.

At 510, the parent cryptographic device may rekey the locally connected child cryptographic device using the local (e.g., serial) connection. One or more new session key(s) may be provided by the parent cryptographic device to the child cryptographic device. The new session key(s) may be determined by the parent cryptographic device using the same long term secret key as was used to derive the initial session keys and/or may be based on a new long term secret key(s), for example if the parent cryptographic device was "filled" or "re-filled" with new long term secret key(s) since the child cryptographic device(s) were initially configured. In an example, the new session key(s) may be derived from random data generated within the parent cryptographic device itself. For example, for some applications rather than using a long term secret to derive the session key(s), a random number generator and/or another random number source to generate the session keys to be provided to the child cryptographic device(s).

At 512, the first child cryptographic device may communicate the new session key(s) to the second cryptographic child cryptographic device over the air. The first child cryptographic device may include an indication that the new session key(s) are to be used for encryption/decryption by the second child cryptographic device in the message that includes the new session key(s). The message may indicate a message sequence number and/or time at which the child cryptographic device(s) will begin performing encryption/decryption using the new session keys. In an example, it may be implicitly determined to begin performing encryption/decryption using the new session key(s) for any messages sent and/or received after receipt of the new session key(s) and/or for messages sent or received a predetermined amount of time after receipt of the new session key(s).

The message including the new session key(s) may be encrypted by the first child cryptographic device using the old session key(s) and transmitted over the air using a first radio to a second radio. The second child cryptographic device may receive the new session key(s) from the second radio. The second child cryptographic device may decrypt the new session key(s) using the old session key(s). In an example, when the second child cryptographic device was provisioned with the old session(s), the parent cryptographic device may have provided the second child cryptographic device with a key(s) to be used for providing new keys (e.g., a re-keying key). The parent cryptographic device may encrypt the new session key(s) using the re-keying key prior to transmitting the new session key(s) to the second child cryptographic device via the first child cryptographic device. The second child cryptographic device may then decrypt the message using the old session key(s) and decrypt the new session key(s) from within the message using the re-keying key.

Upon decryption, the second child cryptographic device may determine that the data included in the message are new session key(s) based on the indication provided in the message by the first child cryptographic device. At 514, the second cryptographic device may begin using the new session key(s), and communications exchanged by the first and second child cryptographic devices may now be encrypted/decrypted using the new session key(s).

In an example, the operator interface of the parent cryptographic device may be used to control various aspects of the locally connected (e.g., serially connected) and remotely connected (e.g., over the air) child cryptographic devices during operation. For example, rather than or in addition to rekeying the child cryptographic devices during operation, the parent cryptographic device may be used to provide a means for the user to control the child cryptographic devices. For example, the operator interface of the parent cryptographic device may be used to allow the user to selecte one or more of the cryptographic mode(s), cryptographic parameter(s), and/or the like to be used by the child cryptographic devices during deployment. The operator interface may be utilized to display status information for one or more of the child cryptographic devices (e.g., power information, encryption/decryption statistics, other configuration information, etc.).

In an example, rather than or in addition to configuring the child devices in the field, the parent/child cryptographic devices may be provided to the operator in a preconfigured state, allowing the operator to operate the child cryptographic device(s) without having to interact with the parent cryptographic device to first configure the child devices. For example, both the parent cryptographic device and one or more child cryptographic device(s) may be shipped in a ready-to-use state (e.g., child cryptographic devices are preloaded with one or more session key(s)). The operator may remove the preconfigured child cryptographic device(s) from the parent and insert them into the end equipment without interacting with the parent cryptographic device. In an example, if the child cryptographic device(s) are preconfigured by the parent cryptographic device prior to being provided to the operator, then the parent cryptographic device may not be provided to the operator. For example, the parent cryptographic device may be used to preconfigure the child cryptographic device(s) (e.g., at the factory), and the child cryptographic devices may be provided to the operator without the parent cryptographic devices. In this case, the same parent cryptographic device might be used to produce large quantities of preconfigured child cryptographic devices, which are then separated from the parent and shipped to the field for use in end equipment. In such a case, a battery circuit may be attached the child cryptographic devices for shipping in order to act as a surrogate for the parent cryptographic device for maintaining the volatile memory of the child cryptographic device(s) (e.g., prevent memory from being cleared from not being connected to an external power source).

In an example, the parent cryptographic device and/or the child cryptographic device(s) may be designed for one-time use and/or for re-use over a limited period of time. The level of intended re-use may affect the selection of components and/or materials for the parent cryptographic device and/or child cryptographic device(s). In an example, the child cryptographic device(s) may be designed for one-time use and/or re-use over a limited period of time, while the parent cryptographic device may be designed for long term re-use. For example, one or more child cryptographic devices may be deployed in mobile platforms for which return after a mission is unexpected (e.g., a missile or rocket, etc.) and/or questionable (e.g., a small UAV). In this manner, if the child cryptographic device is captured or otherwise does not return from a mission, long term secrets may still be protected since the child device does not store long term secrets. The child cryptographic device(s) may be adapted for deployment using a variety of configurations in order to support use in different end equipment (e.g., different bus configurations, different radios, different encryption/decryption modes, etc.). The different configurations utilized by the child cryptographic device may include the use of the same hardware with different software and/or hardware programming and/or may include the use of both different hardware and different software.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A processor may be configured to execute instructions stored in memory to perform the various functions described herein.

Although the concepts and structures disclosed herein have been described with reference to several examples and exemplary embodiments, numerous modifications and variations may be made and still be within the scope described herein. No limitation with respect to any specific example or embodiment is intended to be necessary or mandatory, and the scope of the protection should be plainly apparent based on the language of the following claims.

What is claimed:

1. A system for performing one or more of encryption and/or decryption, the system comprising:
   a parent cryptographic device comprising:
      a key fill port,
      a microprocessor circuit configured to:
         interface to a key fill device via the key fill port,
         authenticate with the key fill device, and
         receive a first cryptographic key from the key fill device,
         determine one or more session keys based on the first cryptographic key,
      a memory configured to store the first cryptographic key, wherein the memory is configured with one or more anti-tamper hardware mechanisms, and
      at least one interface configured to insert the one or more session keys onto one or more child cryptographic devices that are functionally connected to the parent cryptographic device; and
   at least a first child cryptographic device of the one or more child cryptographic devices, wherein at least the first child cryptographic device comprises:

a configuration interface configured to receive the one or more session keys from the parent cryptographic device, and a programmable logic device configured to perform one or more of encryption or decryption of communications exchanged with at least a second child cryptographic device.

2. The system as in claim 1, wherein the parent cryptographic device comprises a plurality of interfaces configured to simultaneously configure the first and second child cryptographic devices.

3. The system as in claim 1, wherein the microprocessor circuit of the parent cryptographic device is implemented via one or more of a field programmable gate array (FPGA) or an application specific integrated circuit (ASIC).

4. The system as in claim 1, wherein the microprocessor circuit of the parent cryptographic device is configured to perform one of more control plane functions related to encryption and/or decryption, and at least the programmable logic device of the first child cryptographic device is configured to perform one or more data plane functions related to encryption and/or decryption.

5. The system as in claim 1, wherein the microprocessor circuit of the parent cryptographic device is configured to authenticate with at least the first child cryptographic device prior to inserting the one or more session keys onto the first child cryptographic device.

6. The system as in claim 1, wherein each of the first and second child cryptographic devices are inserted with at least one common session key.

7. The system as in claim 1, wherein the parent cryptographic device is configured to determine that an authenticated cryptographic ignition key (CIK) is interfaced to the parent cryptographic device prior to inserting the one or more session keys onto the one or more child cryptographic devices.

8. A method for performing one or more of encryption and/or decryption, the method comprising:

a parent cryptographic programmable logic device interfacing to a key fill device via a key fill port;

the parent cryptographic programmable logic device authenticating with the key fill device;

the parent cryptographic programmable logic device receiving a first cryptographic key from the key fill device;

the parent cryptographic programmable logic device determining one or more session keys based on the first cryptographic key;

the parent cryptographic programmable logic device storing the first cryptographic key in a memory that is configured with one or more anti-tamper hardware mechanisms;

the parent cryptographic programmable logic device inserting the one or more session keys onto one or more child cryptographic programmable logic devices that are functionally connected to the parent cryptographic programmable logic device; and a first child cryptographic programmable logic device of the one or more child cryptographic programmable logic devices receiving the one or more session keys from the parent cryptographic programmable logic device; and the first child cryptographic programmable logic device performing one or more of encryption or decryption of communications exchanged with at least a second child cryptographic programmable logic device.

9. The method as in claim 8, wherein the parent cryptographic programmable logic device simultaneously configures the first and second child cryptographic programmable logic devices.

10. The method as in claim 8, wherein the parent cryptographic programmable logic device performs one or more control plane functions related to encryption and/or decryption, and at least the first child cryptographic programmable logic device performs one or more data plane functions related to encryption and/or decryption.

11. The method as in claim 8, wherein the parent cryptographic programmable logic device authenticates with at least the first child cryptographic programmable logic device prior to inserting the one or more session keys onto the first child cryptographic programmable logic device.

12. The method as in claim 8, wherein each of the first and second child cryptographic programmable logic devices are inserted with at least one common session key.

13. The method as in claim 8, wherein the parent cryptographic programmable logic device determines that an authenticated cryptographic ignition key (CIK) is interfaced to the parent cryptographic programmable logic device prior to inserting the one or more session keys onto the one or more child cryptographic programmable logic devices.

14. A system for performing one or more of encryption and/or decryption, the system comprising:

a parent cryptographic programmable logic device configured to:
  interface to a key fill device,
  authenticate with the key fill device,
  receive a first cryptographic key from the key fill device,
  determine one or more session keys based on the first cryptographic key,
  store the first cryptographic key in a memory that is configured with one or more anti-tamper hardware mechanisms,
  insert the one or more session keys onto one or more child cryptographic programmable logic devices that are functionally connected to the parent programmable logic cryptographic device; and a first child cryptographic programmable logic device of the one or more child cryptographic programmable logic devices, the first child cryptographic programmable logic device configured to:
  receive the one or more session keys from the parent cryptographic programmable logic device, and
  perform one or more of encryption or decryption of communications exchanged with at least a second child cryptographic programmable logic device.

15. The system as in claim 14, wherein the parent cryptographic programmable logic device is configured to simultaneously configure the first and second child cryptographic programmable logic devices.

16. The system as in claim 14, wherein the parent cryptographic programmable logic device is implemented, at least in part, via one or more of a field programmable gate array (FPGA) or an application specific integrated circuit (ASIC).

17. The system as in claim 14, wherein the parent cryptographic programmable logic device is configured to perform one of more control plane functions related to encryption and/or decryption, and at least the first child cryptographic programmable logic device is configured to perform one or more data plane functions related to encryption and/or decryption.

18. The system as in claim 14, wherein the parent cryptographic programmable logic device is configured to authenticate with at least the first child cryptographic programmable logic devices prior to inserting the one or more session keys onto the first child cryptographic programmable logic devices.

19. The system as in claim 14, wherein each of the first and second child cryptographic programmable logic devices are inserted with at least one common session key.

20. The system as in claim 14, wherein the parent cryptographic programmable logic device is configured to determine that an authenticated cryptographic ignition key (CIK) is interfaced to the parent cryptographic programmable logic device prior to inserting the one or more session keys onto the one or more child cryptographic programmable logic devices.

* * * * *